United States Patent
Silva et al.

[19]

[11] Patent Number: 5,996,080
[45] Date of Patent: Nov. 30, 1999

[54] SAFE, VIRTUAL TRIGGER FOR A PORTABLE DATA CAPTURE TERMINAL

[75] Inventors: Dennis Silva, San Jose; Paul Beard, Milpitas, both of Calif.; Jeffry A. Howington, Cedar Rapids, Iowa

[73] Assignee: Norand Corporation, Cedar Rapids, Iowa

[21] Appl. No.: 08/726,148

[22] Filed: Oct. 4, 1996

Related U.S. Application Data

[60] Provisional application No. 60/004,813, Oct. 4, 1995.

[51] Int. Cl.$^6$ .............................. G06F 1/00; G09G 5/00
[52] U.S. Cl. ......................... 713/320; 345/169; 345/173
[58] Field of Search .................................. 345/126, 169, 345/173, 179; 364/750, 707; 382/312, 313; 340/825; 713/320, 321; 708/602

[56] References Cited

U.S. PATENT DOCUMENTS

| | | | |
|---|---|---|---|
| 4,545,023 | 10/1985 | Mizzi | 364/709.13 |
| 4,916,441 | 4/1990 | Gombrich | 345/169 |
| 5,202,817 | 4/1993 | Koenck et al. | 345/169 |
| 5,402,152 | 3/1995 | Needham | 345/179 |
| 5,432,531 | 7/1995 | Calder et al. | 345/173 |
| 5,612,719 | 3/1997 | Beernink et al. | 345/173 |
| 5,656,804 | 8/1997 | Barkan et al. | 235/472 |

*Primary Examiner*—Paul P. Gordon
*Attorney, Agent, or Firm*—Akin, Gump, Strauss, Hauer & Feld, L.L.P.

[57] ABSTRACT

A portable, hand-held data collection terminal is of modular structure including, among other modules, multiple endcap modules and radio frequency communications pod modules, each of which may be chosen from a plurality of modules available for assembly into the terminal unit therby providing a plurality of modular combinations thereof. The functions of the multiple modular combinations are activated and controlled by a virtual trigger on a touch sensitive display. The virtual trigger may be positioned anywhere on the display to ergonomically accommodate different users. The terminal evaluates touch images retrieved from the touch sensitive display to determine whether they constitute an intentional touch. Unintentional touching will not activate the virtual button. Various other safety and power saving features are provided via orientation and motion sensors placed within the terminal.

14 Claims, 8 Drawing Sheets

SAFE, VIRTUAL TRIGGER FOR A PORTABLE DATA CAPTURE TERMINAL

CROSS REFERENCE TO RELATED APPLICATIONS

This application claims priority pursuant to 35 U.S.C. Sec. 119(e) to U.S. Provisional Application Ser. No. 60/004,813, filed Oct. 4, 1995. Such provisional application is hereby incorporated herein by reference in its entirety.

BACKGROUND

1. Technical Field

The present invention relates generally to data collection and processing systems and specifically to portable data terminals as operator manipulatable data input and output services modularly adaptable to provide multiple input and output functionality, wherein the functions of the data terminal may be user-triggered by a virtual trigger.

2. Description of Related Art:

Portable data terminals are generally known components of state of the art business systems. The data terminals may be taken to merchandise storage facilities for inventory control or customer service transactions, or may be used in any one of various other commercial applications to serve as data input or output devices for central data processing and control stations.

Central data processing and control stations are most useful when business data are always current and readily available. Prompt data entry and retrieval at the working level through the various operator controlled portable data terminals is recognized as a basis for optimizing, among various business activities, business forecasting and marketing operations, to name just a few.

Increased versatility in data input and output arrangements tend to increase power usage of the portable data terminals, therby decreasing usage periods between battery exchanges or recharging operations. Touch sensitive or pen actuated data input systems are known. However, in the past, such pen actuated data input systems were generally limited to the use of pens for digitizer boards or in conjunction with full keyboard type computer terminals. While the former devices are considered limited in their application, the latter are bulky, even as laptop computers, and are not useful for practical data entry and retrieval in shop, warehouse, store or delivery environments.

The problem to solved by the present invention relates to the placement of trigger switches on a hand-held portable data terminal which are utilized to initiate data input and output functions. A modular hand-held data terminal of the present invention is capable of adaptation to multiple modular configurations of the data terminal in order to provide various data collection and communications functions. Because the data terminal is modularly adaptable to a variety of functions through the utilization of modular components, it is difficult to design the terminal to have physical switches theron which are capable of being utilized with all of the modular attachments to the data terminal which are ergonomically placed in a position suitable for all users. Since the ideal placement of such switches on the data terminal is unique to each user of the terminal, the placement of the switches on the data terminal will always be a design compromise.

Prior art data terminals typically implement actual physical trigger switches. Often, the trigger switch is implemented as a pistol-type switch which is analogous to a hand gun in design. Such handgun styled data terminals are usually large, bulky and awkward, the inelegance of which is realized when a pistol styled data terminal is placed upon a flat surface such as a table. Further, as advancement in miniaturization of powerful electronics results in a reduction in the size of hand-held data terminals, space on the data terminal for the switches becomes limited. Ideally, the concept and utility of a small, portable, hand-held modular data terminal would be furthered by having function triggering switches that are modularly positionable at a wide range of locations such that the positioning of the trigger switch may be user customized while at the same time being adaptable to a wide variety of users.

Moreover, accidental triggering may easily occur with code readers, potentially leading to at least temporary vision impairment. Such accidents often occur when a terminal having code reading capability is overturned or in a holster or docking unit.

An object of the present invention is to solve at least the aforementioned problems. This and other objects of the present invention will become apparent from examination of the drawings and remainder of the specification which follows.

SUMMARY OF THE INVENTION

The present invention provides a portable data collection terminal that may be utilized by any of a plurality of users. The housing of the terminal has a display and a touch sensitive panel assembly disposed thereon. The terminal also has an image capture circuit associated therewith. A virtual button is displayed on the display for use in triggering the image capture circuit. The position of the virtual button on the display corresponds to a location selected by any of the plurality of users via the touch sensitive panel.

In addition, the portable data collection terminal may further comprise orientation sensing circuitry that selectively disables the image capture circuit. Similarly, the terminal may further comprise motion sensing circuitry that also selectively disables the image capture circuit.

The terminal may also further comprise a radio modem and a second virtual button that controls the activation of the radio modem.

Further, the touch sensitive panel assembly may be used to generate touch image information for use in attempts to identify an intentional selection of the virtual button. Only intentional selections should cause the triggering of the image capture circuit. Of course, the virtual button might also comprise two buttons that require simultaneous depression to cause triggering of the image capture circuit.

Other aspects of the present invention may be found in another portable data collection terminal utilized by any of a plurality of users. The terminal comprises a control circuit, a display, a touch sensitive panel assembly, a panel interface circuit, a first circuit supporting a predetermined functionality and a virtual button displayed on the display for use in triggering the first circuit. The control circuit and panel interface circuit together attempt to screen unintentional selections of the virtual button based on the touch image information.

The portable data collection terminal may further comprise an orientation sensor coupled to the control circuit, and the control circuit selectively responding to the orientation sensor to attempt to screen unintentional selections of the virtual button. Similarly, the terminal may further comprise a motion sensor coupled to the control circuit, and the control circuit selectively responding to the motion sensor to attempt to screen unintentional selections of the virtual button. The control circuit might be configured to selectively respond to the motion sensor by entering a low power state.

The first circuit comprises an image capture circuit or a radio modem, for example. Moreover, the virtual button comprises two buttons requiring simultaneous depression to cause triggering of the first circuit.

Many other aspects of the present invention will be appreciated with full reference to the specification, drawings and claims.

BRIEF DESCRIPTION OF THE DRAWINGS

The numerous objects and advantages of the present invention may be better understood by those skilled in the art by reference to the accompanying figures in which.

DETAILED DESCRIPTION

Figure 1:
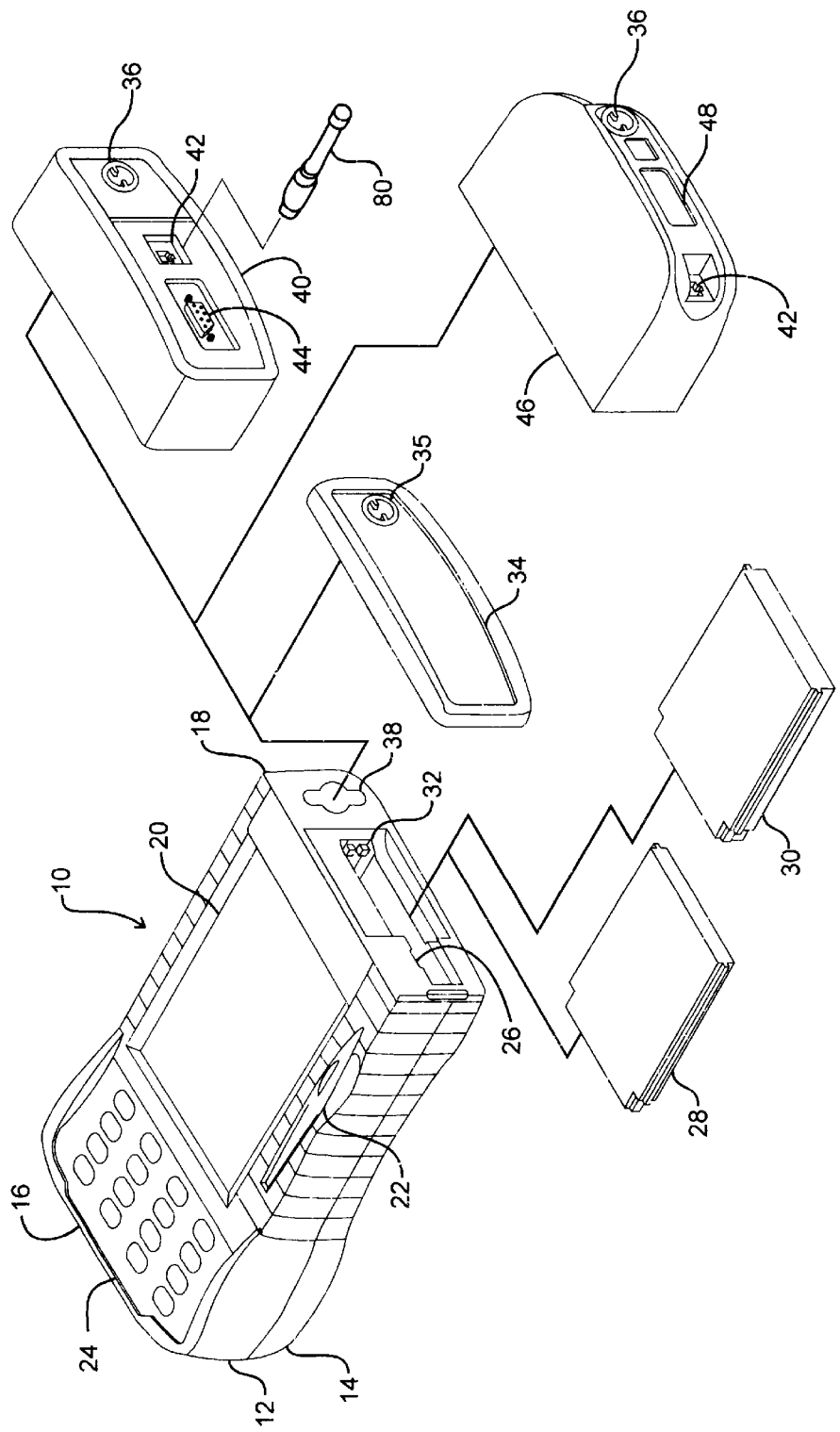
FIG. 1 illustrates an exemplary portable hand-held data collection terminal of the present invention.

FIG. 1 illustrates an exemplary portable hand-held data collection terminal of the present invention generally designated by the numeral 10. The portable data terminal 10 is a hand-held, portable unit that is capable of operating from a self-contained power source. Such a portable data terminal 10 may operate in what is referred to as a batch mode in which data are collected, and stored within the data terminal 10 to be transferred to an alternate data processing unit or host computer (not shown) in a comprehensive batch type data transfer operation. In the alternative, the data terminal 10 may be in communication with such a host computer in an interactive or on-line mode via a data communications link such as radio frequency transceiver arrangement, a capable-type arrangement or an infrared data link.

The data terminal 10, as described herein and viewed from above, generally has an elongated, rectangular shape comprising an upper housing shell 12 and a lower housing shell 14. The data terminal 10 preferably comprises a molded high-impact strength plastic material to provide resistance and durability such that the data terminal may survive multiple drops to concrete from hand-held levels, driving rain and moisture, and extreme operating temperatures. In an exemplary embodiment of the present invention, the data terminal 10 is designed to be operable in environments having a temperature range of −20° C. to 50° C. and storable in environments having a temperature range of −30° C. to 70° C. The data terminal is preferably designed to withstand humidity ranging from 5% to 95% atmospheric humidity and resist rains of up to 6" (1524 mm) rain per hour and winds of up to 40 miles (64 km) per hour.

The data terminal 10, when viewed from above in a typical hand-held position has a lower end portion 16 and a top end portion 18. The data terminal 10 has disposed on the upper housing shell 12 near the top end portion 18 a display screen 20 for displaying viewable information. The display screen 20 is preferably a state of the art liquid crystal display (LCD) screen. State of the art display screens generally utilize double super twist LCD technology. This type of display screen provides satisfactory viewing contrast under most direct lighting conditions. Backlighting of the display screen 20 may be utilized to provide supplemental illumination of the display screen. Power management considerations may entertain selective illumination in accordance with varying ambient light levels. The contrast control of the LCD display 20 preferably includes automatic temperature compensated contrast control.

The display screen 20 preferably provides a rectangular display area comprising a 240 (width)×320 (length) pixel array being a standard CGA format controlled display having a VGA driver interface and 4 gray scales. In an alternative embodiment, the display 20 may be adapted to provide improved display capabilities such as greater number of gray scales or colors, for example. The display screen 10 further provides touch screen actuated data input and user face control. The display screen 20 preferably responds to tactile stimuli such as the finger of the operator or an input stylus 22. Signature capturing capabilities are further provided by utilization of the input stylus 22. Touch screen interface functions are provided by utilization of various software environments such as MS-DOS™ or Microsoft Windows with Pen Extension™ available from Microsoft Corporation, Power PenPal™ available from PenPal Associates, or Pen Right!Pro™ available from PenRight Corporation, for example. The portable data collection terminal 10 of the present invention preferably utilizes a 386SL 33 MHz microprocessor and PC architecture in order to operate in 386 enhanced mode. The data terminal 10 further utilizes power management in order to prolong battery life.

The data terminal 10 preferably includes a numeric 16-key keypad 24 disposed on the upper housing shell 12 near the bottom end 16. The keypad 24 preferably provides tactile keying response for feedback of successful keyboard entry. The keys of the keypad 24 are preferably ergonomically shaped to the human fingertip and are arranged and color coded according to function to enhance key recognition and enhance the speed of key entry. The keypad 24 may further provide multiple interchangeable keypad overlays to accommodate multiple keypad function arrangements. The keypad 24 preferably includes multi-directional control keys providing navigation control functions for the display screen 20 such as scrolling, for example.

The data terminal 10 preferably has disposed at the top end 18 a PCMCIA card receptacle 26 to removably receive and utilize standard C cards (alternatively referred to as PC cards). The PCMCIA card receptacle 26 is preferably designed to utilize two Type II PCMCIA cards such as PC card 28 or one Type III PCMCIA cards such as PC card 30. The PCMCIA card may be utilized to provide various peripheral and supplemental computer functions such as extended volatile random access memory (RAM), extended nonvolatile semipermanent memory such as FLASH memory, modem functions, and radio frequency transceivers including RF WAN (wide area network) and RF LAN (local area network) cards, for example. The PCMCIA cards may be removed from the PCMCIA card receptacle 26 by PC card ejector buttons 32.

The data terminal 10 may utilize a standard endcap 34 at the top end 18 of the data terminal 10 to provide enclosure of the PCMCIA card receptacle 26. The endcap 34 preferably comprises high-impact-resistant plastic enclosed with co-molded rubber to provide impact protection and shock absorption. The endcap 34 has disposed on one side a quick-release lock assembly 36 which may provide quick-releasing and securing of the endcap 34 to the top end 18 of the data terminal 10. The lock aperture 38 may receive the lock assembly 36 and fasten or release the end cap 24 when the lock assembly is rotated for a one-quarter turn.

In an exemplary embodiment of the present invention, the data terminal 10 is designed to modularly utilize various types of modular endcaps. The type of modular endcap to be utilized may be determined by the particular data collection and transfer functions desired and by the particular configuration of the data terminal. For example, the data terminal 10 may utilize a data port endcap 40 having multiple data ports such as an RJ-11 modular phone jack 42 and a 9-pin d-sub serial connector 44. The data port endcap 40 may be utilized in lieu of a standard endcap 34 in conjunction with a PC card to provide a phone jack receptacle 42, for example. The RJ-11 phone jack 42 may be replaced with an antenna 80 for connection to a PCMCIA modem card to provide an RF link rather than a direct wire link, for example. The 9-pin D-subminiature connector 44 may be utilized to provide a serial port connection to a peripheral device such as a printer, for example. The data port endcap 40 preferably has substantially the same quick-release lock assembly 36 as the standard endcap 34 which may be slightly more elongated to accommodate the large size of the data port endcap 40.

The data terminal 10 may also utilize a code reading module or image capture module or laser scanner modular endcap 46 having laser scanner circuitry therein for scanning optically readable data files such as bar codes, for example. The endcap 46 includes a laser scanner window 48 and may include an RJ-11 phone jack 42. The laser scanner module also has substantially the same type of quick-release lock assembly 36 as the data port endcap 40 and the standard endcap 34 with an even longer lock assembly 36 to accommodate the larger size of the endcap 46. The lock assembly 36 of the endcap 46 may be further modified to generally conform the contours of the endcap 46 when the endcap 46 is secured to the top end 18 of the data terminal 10.

The endcap 46 may utilize standard and long range integrated laser scanners for laser scanning functions such as laser scanning of standard bar code labels. Alternatively, the endcap 46 may utilize charge coupled device (CCD) circuitry for two dimensional optically readable data file reading such as for reading state of the art two dimensional data code files. A tethered scanner unit may be utilized as well.

Figure 2:
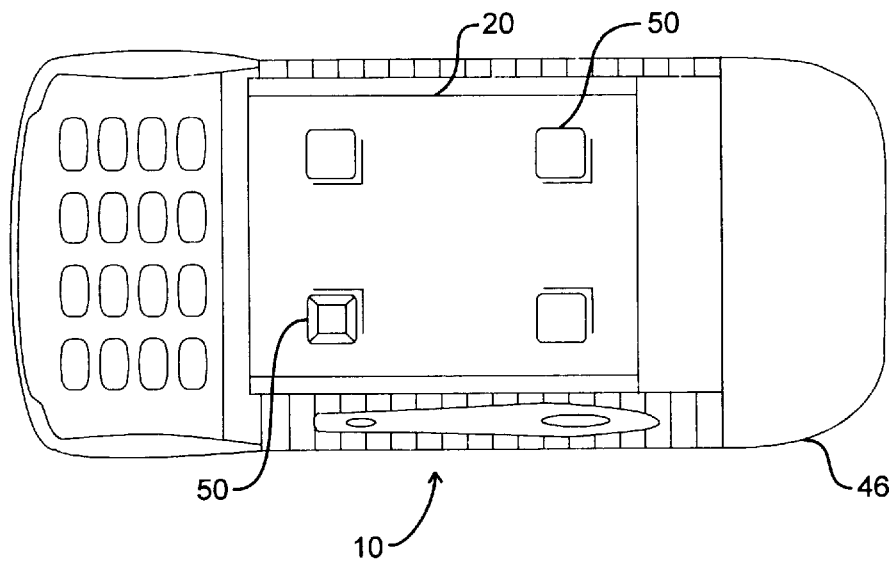
FIG. 2 depicts an exemplary embodiment of the present invention illustrating the implementation of a virtual trigger.

FIG. 2 depicts an exemplary embodiment of the present invention illustrating the implementation of a virtual trigger. A virtual trigger 50 is preferably implemented with the touch screen user interface of the display 20. The virtual trigger 50 may be represented as a graphical icon on the display 20. The user interface software which the terminal 10 runs preferably allows the virtual trigger icon to be placed anywhere on the display 20. The virtual trigger 50 may be dragged across the display in a manner similar to the way in which icons may be dragged across a display screen with a conventional computer mouse device. Alternatively, the virtual trigger 50 may be positioned anywhere on the display 20 by utilization of the keypad 24 for direction key input control in a manner substantially similar to the positioning of a cursor on a standard display using a standard keyboard.

The data terminal 10 virtual trigger may be to perform multiple functions such as initiating a scan of an optically readable data file when the terminal 10 is fitted with a endcap 46 for scanner input. Alternatively, the virtual trigger 50 may be used to batch data to a host terminal in a wireless local area network in which the data terminal 10 is utilized when a radio modem PC card 30 is utilized. The function of the virtual trigger 50 is preferably programmable with the user interface software which the data terminal is running.

The virtual trigger 50 may be represented by a plurality of icons which are preferably user selectable. For example, the user may be able to select between different sized virtual trigger icons 50 on order to accommodate the size of the digit utilized to depress the trigger 50. Additionally, the present invention contemplates utilizing multiple virtual triggers simultaneously to provide multiple trigger functions. For example, two virtual triggers may be used for scanning wherein both triggers 50 are required to be simultaneously activated to initiate a scan in order to prevent accidental scanning which may waste battery capacity. Alternatively, two virtual triggers 50 may be configured, the first for activating the endcap 46 and the other for batching the data collected by the scanner to a host computer by an RF modem PC card 30.

Figure 3:
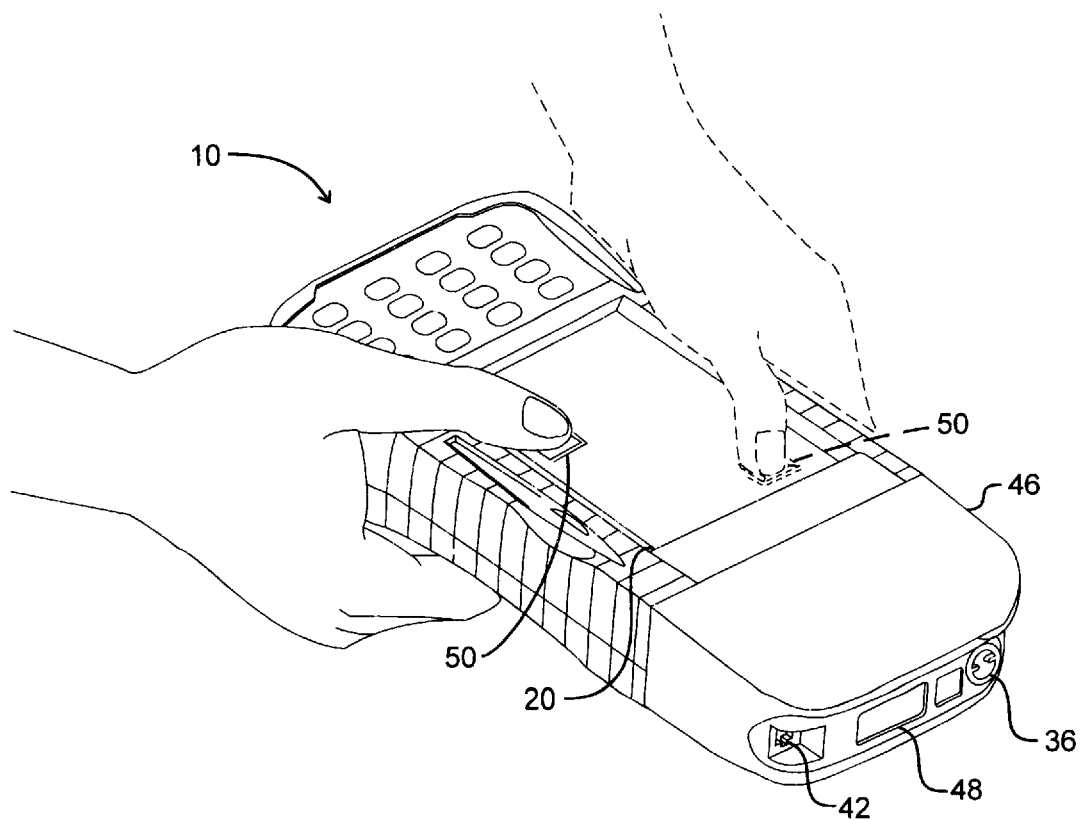
FIG. 3 depicts an exemplary modular, portable, hand-held data collection terminal of the present invention illustrating the application of the virtual trigger.

FIG. 3 depicts an exemplary modular, portable, hand-held collection terminal of the present invention illustrating the application of the virtual trigger. The virtual trigger 50 may be positioned by a right-handed user for optimal ergonomic triggering. The hand-held data terminal 10 is preferably ergonomically designed to fit comfortably in one hand of the user while still retaining maximum utility. Thus, the virtual trigger 50 may be placed in the exact position on the display 20 where the thumb of the user naturally falls. The virtual trigger 50 may also be positioned in alternate locations on the display 20 in order to accommodate a user having hands of a different size and shape who may use the terminal 10 on a work shift subsequent to the prior user. The second user may place the virtual trigger 50 a position which is ergonomically optimized for his own use of the data terminal 10.

The display 20 preferably provides touch screen data input and user interface control as described in the description of FIG. 1. When the user touches the virtual trigger 50 to activate a particular function, the touch screen input display 20 preferably, electronically senses the coordinates of the screen which received the tactile input of the touch by the user. When the tactile input coordinates match the position of the virtual trigger 50, the software interface of the data terminal 10 preferably triggers a hardware control signal which may be received by the particular hardware device to be activated, such as endcap 46. The particular function of the hardware device to be activated may therby be triggered, such that the scanner pod initiates scanning, for example.

Figure 4:
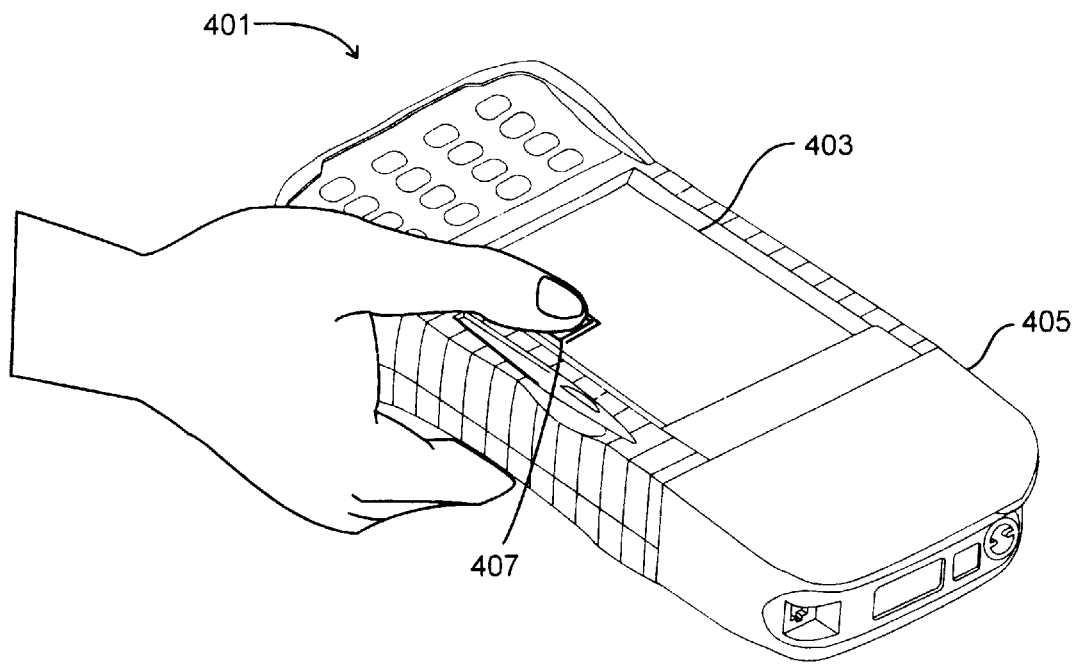
FIG. 4 is a perspective diagram illustrating a portable terminal built in accordance with the present invention which prompts a user for virtual trigger positioning.

FIG. 4 is a perspective diagram illustrating a portable terminal built in accordance with the present invention which prompts a user for virtual trigger positioning. In particular, a data terminal 401 provides a user with the ability to locate or relocate a virtual trigger through a configuration process. First, the terminal 401 delivers a message via a touch screen display 403 prompting the user to comfortably grasp the terminal 401 in an orientation which code reading will normally take place. Thereafter, the terminal 401 prompts the user to press the touch screen display 403 with their thumb. In response, the touch screen display 403 captures information regarding the thumb press and creates and appropriately locates a virtual trigger button 407. Moreover, a two thumb press by a user during the configuration process would operate to create and locate two such buttons that would both require a thumb press to initiate code reading via a code reading module or image capture module or laser scanner modular endcap 405. Thus, the virtual trigger may be easily located and relocated through configuration setup to accommodate: 1) any size hand; 2) any grip; and 3) multiple trigger buttons.

Figure 5:
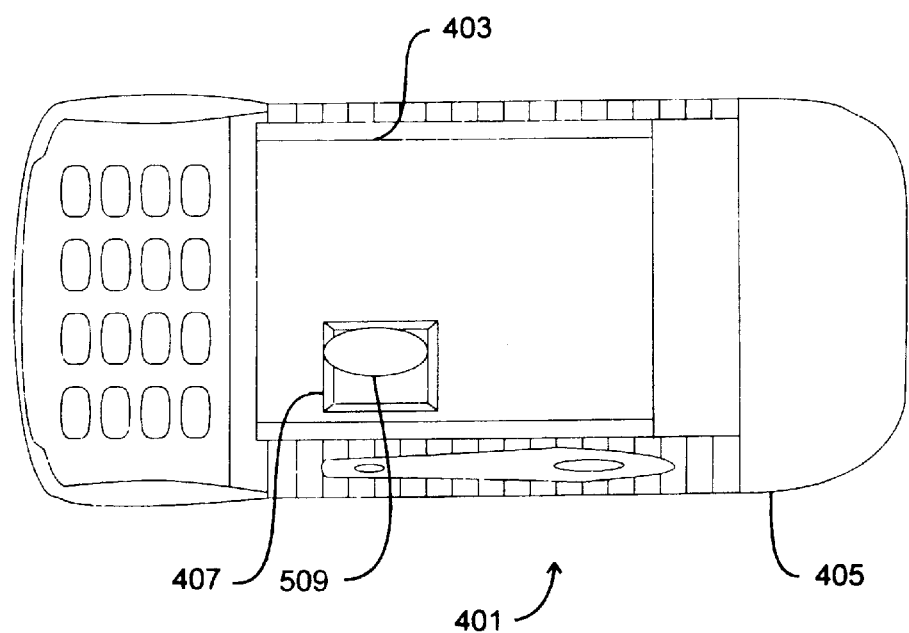
FIG. 5 is a top view of the portable terminal of FIG. 4 wherein the characteristics of the depression of the touch panel is evaluated to determine whether or not the depression was intentional.

FIG. 5 is a top view of the portable terminal of FIG. 4 wherein the characteristics of the depression of the touch panel is evaluated to determine whether or not the depression was intentional. Safe operation of hardware associated with the terminal 401 may prove critical depending on the configuration. As illustrated, the data terminal 401 includes an endcap 405 which might be used to capture digital (pictorial) or coded images. Accidentally triggering the endcap 405 will not only waste valuable battery power, but may also effect a user's vision. For example, when the endcap 405 utilizes a laser scanning light source, an accidental trigger might cause the laser beam to scan across a user's eye. Similarly, an accidentally triggered flash-type light source might temporarily blind a user. In either case, it is desirable to prevent accidental triggering.

Accidental triggering might be prevented by requiring a two button triggering system as previously described. However, the terminal 401 utilizes another method. Specifically, upon configuration setup, a touch screen display 403 captures not only the location of the thumb press, but also captures characteristics of the thumb press. During setup, the terminal 401 prompts a user to comfortably grasp the terminal 401, and firmly provide a thumb press. In response, the touch screen display 505 records area information of the thumb press. This process of grasping, pressing and recording may occur only once per configuration setup or several times to provide repeatability information.

The terminal 401 concludes the configuration setup by utilizing the recorded thumb press information to appropriately size and locate the button 407. Thereafter, when attempting to initiate an image capture via the endcap 405, the user need only comfortably grasp the terminal 401 and provide a thumb press. Because the button 407 has been specifically sized and located for that user, looking for the button before pressing is not required. Thus, the image capture process with such a virtual trigger operates in a true aim and shoot manner, and not in an aim, look at the screen to position the thumb, aim again and shoot manner.

The touch screen display 403 comprises a touch sensitive panel assembly placed on top of a liquid crystal display, both well known in the art. The touch sensitive panel assembly comprises a two panel separated by a small air gap. The inner surface of both panels receive transparent conductive coatings. The conductive coating of one of the panels is etched in a horizontal orientation to create small, conductive, horizontal traces. The conductive coating of the other panel is similarly etched but in a vertical orientation. The panels thus form an X-Y matrix with the resolution being the number of etched lines. Upon placing a thumb or finger on the touch screen display 403, the two panels of the touch sensitive panel assembly are pressed together, creating current paths between the two plates along the horizontal and vertical traces that happen to come into contact. Scanning circuitry monitors which vertical traces happen to contact each horizontal trace, thus effectively providing a digital image of the thumb press to the terminal 401. Many other types of touch panel assemblies might also be employed, such as infrared, capacitive, analog resistive, etc.

Once a button has been located and sized, e.g., the button 407, the data terminal 401 utilizes the digital image (or images) of the thumb captured during setup to screen unintentional button presses. For example, intentionally pressing and contacting in an area 509 generates a corresponding image that is compared to the image(s) captured during setup. If the comparison proves successful, a trigger event initiates image capture processing by the module 405. However, if an unintentional pressing occurs which delivers a quite different image to the touch screen display 403, no triggering will occur even if the pressing occurs over the button 407. In this way, thumb presses must be recognized to prevent unintentional results. The user can easily perform configuration setup again if intentional thumb presses are not recognized.

Recognition of a thumb press is accomplished by comparing the center point and approximate area of the press as detected by the touch panel assembly with stored center point(s) and approximate area(s) captured during setup. For example, if a thumb press image center is located within the button area and within a 50% to 200% of that stored during setup, the thumb press will be recognized and triggering will occur. Otherwise, for example when a user's palm causes the depression, even if the image center is located within the button area, the terminal 401 will conclude that the image area is too large to be a thumb press and will not trigger the module 405.

Furthermore, after triggering, if the pressing of the touch screen 405 is removed, the terminal 501 automatically disables the endcap 405, preventing the continuation of an accidental or unwanted operation.

Figure 6:
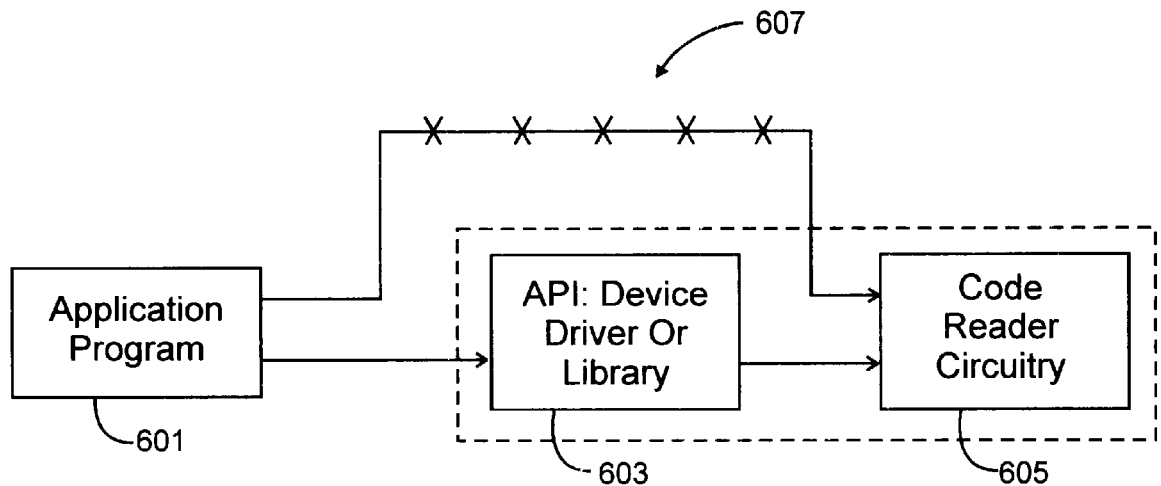
FIG. 6 is a functional diagram illustrating the isolation of code reader circuitry from an application program through use of a device driver or library for safety concerns.

FIG. 6 is a functional diagram illustrating the isolation of code reader circuitry from an application program through use of a device driver or library for safety concerns. To prevent an application programmer from accidentally overriding the safety mechanisms of the present invention, an application program 601 is isolated from code reader circuitry 605 via an encapsulating software interface 603.

In particular, instead of permitting the application program 601 to directly create a trigger button and directly manage the button's interaction with the code reader circuitry 605 as indicated by a path 607, the application program 601 is forced to act through the encapsulating software interface 603. Not only does this prevent the application programmer from overriding built in safety constraints, but it also isolates the application programmer from the intricacies of the code reader circuitry 605. The encapsulating software interface 603 may take the form of a device driver or a linkable library, for example. Therefore, to create a virtual trigger, the application program 601 merely interfaces with a set of program objects defined in a programmers interface specification.

The application program is involved in the creating, enabling, disabling and deleting the virtual trigger button. Other interaction with the button is handled by the encapsulating software interface 603. For example, when the application program 601 requests the creation, the encapsulating software interface 603 responds by creating the button. When the application program 601 requests enablement, the encapsulating software interface 603 enables the button. When the button is pressed, the encapsulating software interface 603 fields the event and triggers the code reader circuitry 605. When the button press is removed, the encapsulating software interface 603 fields the event and disables the code reader circuitry 605, and so on.

Figure 7:
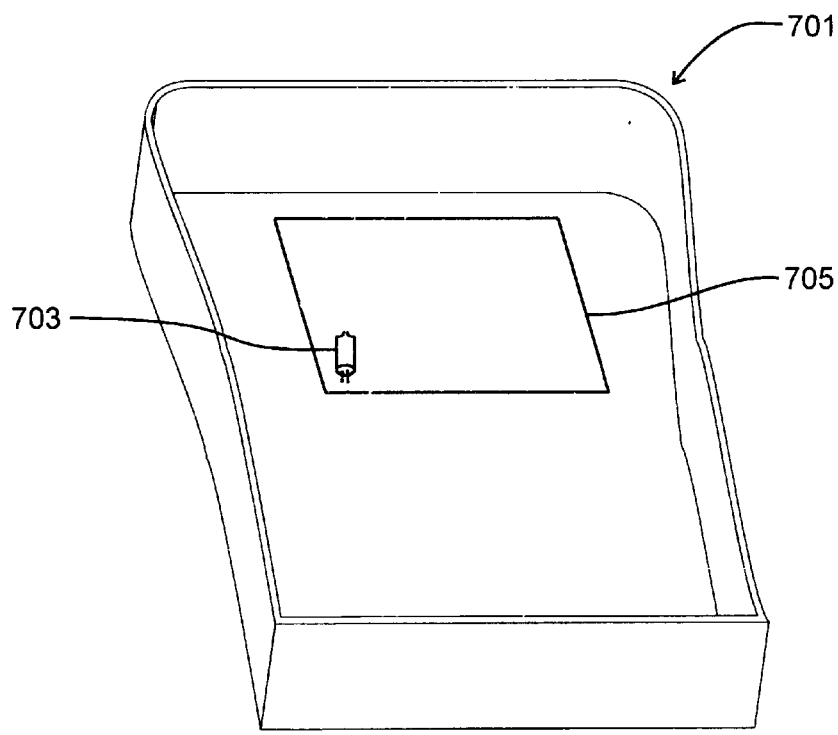
FIG. 7 is an inside view of a portable terminal of the present invention which incorporates a mercury switch to identify the orientation of the terminal.

FIG. 7 is an inside view of a portable terminal of the present invention which incorporates a sensor to identify the orientation of the terminal. With orientation known, further safety provisions can be implemented to prevent accidental triggering of functionality (such as laser scanning) when the terminal is in an orientation in which such functionality will never be used. In particular, within a bottom half of a housing shell 701, a sensor 703 is located on a circuit board 705 to detect the orientation of the fully assembled terminal. For gross orientation detection, a single mercury switch may be used. Multiple switches might also be used.

For example, when using a single mercury switch as the sensor 703, the sensor 703 detects whenever the terminal is right side up. If the terminal is tilted towards ninety degrees or more in any direction (such as upside down), the sensor 703 detects the state and through associated circuitry delivers an indication to the encapsulation software regarding the orientation. If the application program 601 has disabled orientation restrictions via the encapsulation software interface 603, the receipt of orientation information by the interface 603 will generate no response. Otherwise, if the orientation restrictions have not been disabled, upon receipt of the orientation information, the interface 603 disables the code reader circuitry 605. Thus, upon placing the terminal upside down or within a vertical holster or docking unit, the light source is be disabled.

Additionally, upon receipt of such orientation information, the interface 603 places at least part of the terminal in a low power consumption state. For example, when upside down, in most environments, the terminal and image capture module need not remain in a high power state. Therefore, the interface 603 powers down the image capture mode and directs the terminal circuitry to enter a low power state. Upon detecting orientation within normally operable ranges, the interface 603 responds to the sensor 703 to direct the terminal circuitry and interface 603 to return to a higher power state. Of course, the application program 601 may also disable the power saving functionality via the software interface 603. Thus, the sensor 703 supports both safety and power saving concerns associated with the data terminal.

Moreover, in another embodiment, the sensor 703 additionally detects motion or acceleration. Based on such motion or acceleration, the interface 603 (unless disabled by the application program 601) selectively enables and disables the code reader circuitry 605. For example, during periods of relatively rapid acceleration, the interface 603 responds to the sensor 703 by disabling the circuitry 605. Upon relatively low acceleration (as might be found when attempting to read a code), the interface 603 responds by enabling the circuitry 605. Additionally, as before, power saving benefits are also experienced with such selective operation.

Depending on the embodiment, the sensor 703 may constitute a plurality of sensor elements for identifying orientation, motion and/or acceleration. The application program 601 may selectively disable such safety and power saving functionality based on the needs of a given task.

Figure 8:
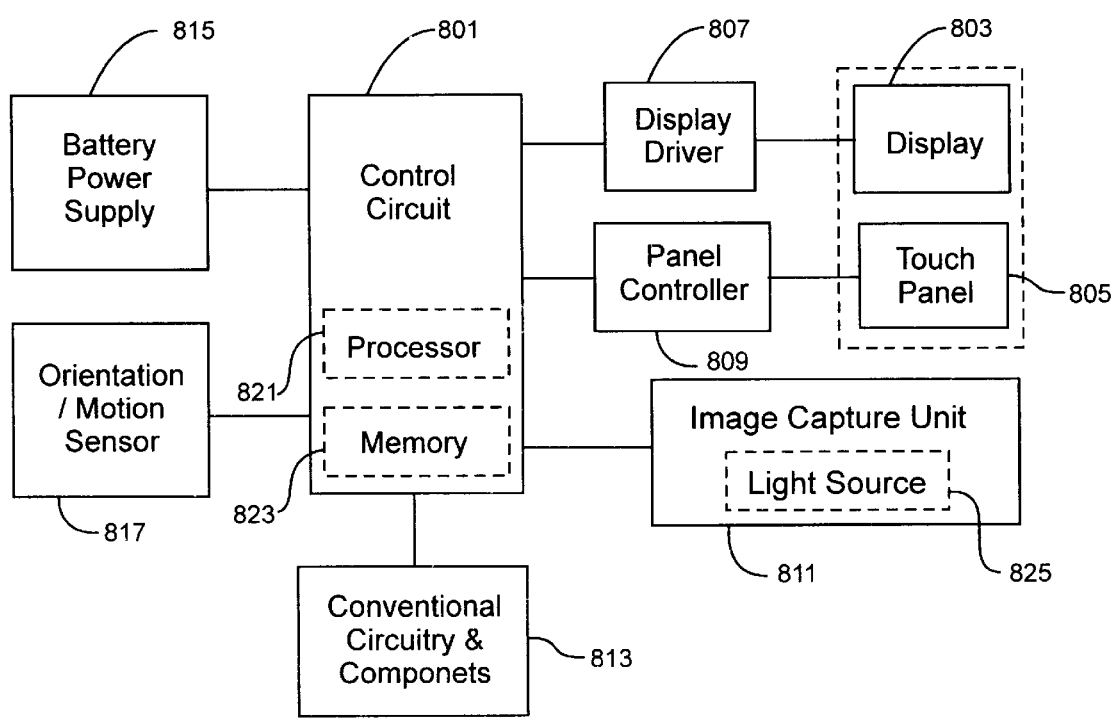
FIG. 8 is a schematic block diagram illustrating exemplary functionality of a portable terminal built in accordance with the present invention.

FIG. 8 is a schematic block diagram illustrating exemplary functionality of a portable terminal built in accordance with the present invention. Within the terminal, a control circuit 801 interfaces with a display 803 and a touch panel 805 via a display driver 807 and panel controller 809. The control circuit 801 also interfaces with an image capture unit 811 and other conventional circuitry and/or components 813. The control circuit 801 selectively controls power delivery from a battery power supply 815. Orientation/motion sensor(s) 817 is also provided to support the various safety and power saving functionality previously described.

Specifically, the control circuit 801 typically comprises a processor 821 and associated memory 823. The processor 821 executes the application program 601 and encapsulation software interface 603 (FIG. 6) out of the memory 823. The code reader circuitry 605 (FIG. 6) may be found within the image capture unit 811, and having a light source 825. Pursuant to the application program 601 and interface 603 (FIG. 6), the control circuit 801 first interacts with the user via configuration setup to size and place the virtual trigger button on the display 803. Thereafter, the control circuit 801 enables the triggering functionality if: 1) orientation/motion sensing proves appropriate or is disabled; and 2) the application software has specifically enabled the functionality. Otherwise any trigger attempt (i.e., trigger button press on the touch panel 805) will be ignored.

If triggering functionality is enabled, the pressing on the touch panel 805 causes the panel controller 809 to deliver image information related to the touch (hereinafter the "touch image") to the control circuit 801. The control circuit 801 responds by attempting to determine whether the touch image was an intentional attempt to select the trigger button. If a touch image is determined to be intentional, the control circuit 801 signals the image capture unit 811, beginning the capture process which involves use of the light source 825. If the pressing of the button on the touch panel 805 is removed before the capture process has been completed, the encapsulation software interface 603 directs the control unit 801 to immediately disable the capture unit 811.

If the terminal is in an upside down or other non-standard orientation, in most environments, code reading would not be possible or desirable. Thus, such orientations can be detected by the sensor(s) 817, causing the control circuit 801 (unless otherwise prevented to do so by the application program 601) to disable the capture unit 811. Likewise, rapid acceleration can also cause such disablement. Furthermore, although only the image capture unit 811 is described as being disabled, other conventional circuitry or components 813 might also be disabled when the terminal is out of normal operating orientation or inappropriately accelerating or moving.

The control circuit 801 also controls power delivery from the power supply 815 when out of normal operating orientation. If, for example, the terminal is upside down and the display 803 is not accessible, the control circuit 801 either causes the image capture unit 811 to enter a low power consumption state, else completely removes the power from the image capture unit 811, depending on the characteristics of the specific image capture unit installed. Power consumed by the conventional components and circuitry 813 may be minimized in the same way. Additionally, when the sensor 817 indicates that the terminal cannot perform any normal operation under the current orientation conditions, the control circuit 801 may also enter a low power state.

Figure 9:
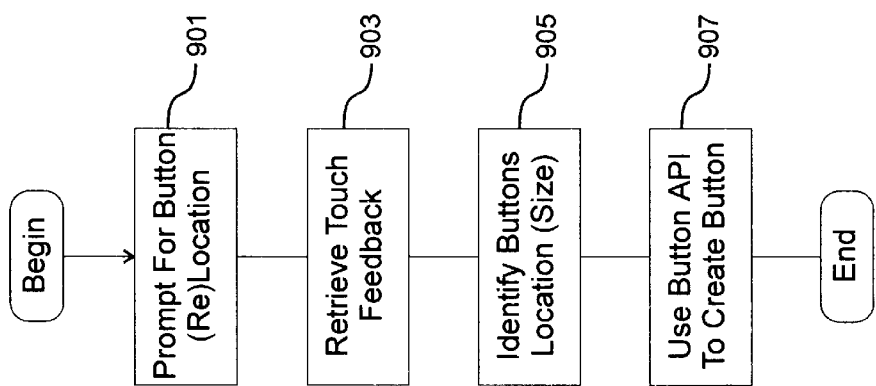
FIG. 9 is a flow diagram illustrating the operation of the terminal of FIG. 8 when prompting a user to locate the virtual trigger button.

FIG. 9 is a flow diagram illustrating the operation of the terminal of FIG. 8 when prompting a user to locate or relocate the virtual trigger button. In particular, the terminal first prompts the user to comfortably grasp and press the terminal display at a block 901. At block 903, the press is detected and captured, i.e., as the touch image. Although not shown, the terminal may repeat the functionality designated by the blocks 901 and 903 to capture a plurality of touch images for a more accurate determination that follows. From the touch image (or images), the terminal identifies the button location and size at a block 905. Thereafter, the terminal creates the virtual trigger button at a block 907, completing the configuration setup process.

Figure 10:
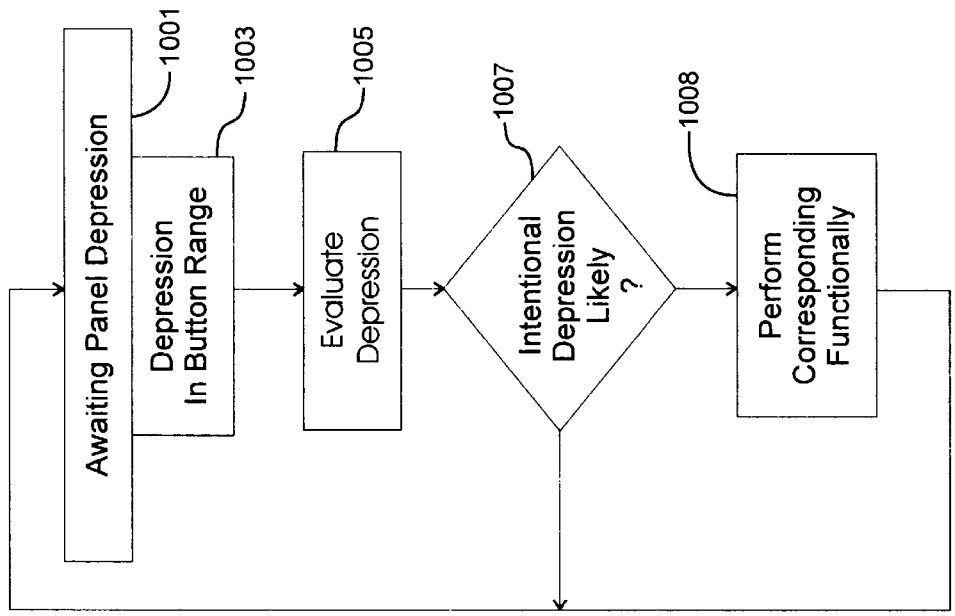
FIG. 10 is a flow diagram illustrating the operation of the terminal of FIG. 8 when attempting to distinguish unintentional touch panel depressions from intentional depressions.

FIG. 10 is a flow diagram illustrating the operation of the terminal of FIG. 8 when attempting to distinguish unintentional touch panel depressions from intentional depressions. At a block 1001, the terminal waits with virtual trigger enabled for a panel depression. Upon the pressing of the panel as indicated by an event block 1003, the terminal vectors to evaluate the depression, i.e., the touch image, at a block 1005. If the depression appears to be unintentional, the terminal branches at a block 1007 to return to the wait state at the block 1001. However, if the depression appears intentional, the terminal performs the functionality associated with the virtual trigger at a block 1008 before returning to the wait state at the block 1001. The associated functionality may be, for example, the triggering of a bar code reading event, the capture of a digital image, etc. The determination of intent at the block 1005 is based on a relative comparison of area and touch image center as previously described. More or less complex comparison processing may be used as an alternative.

Figure 11:
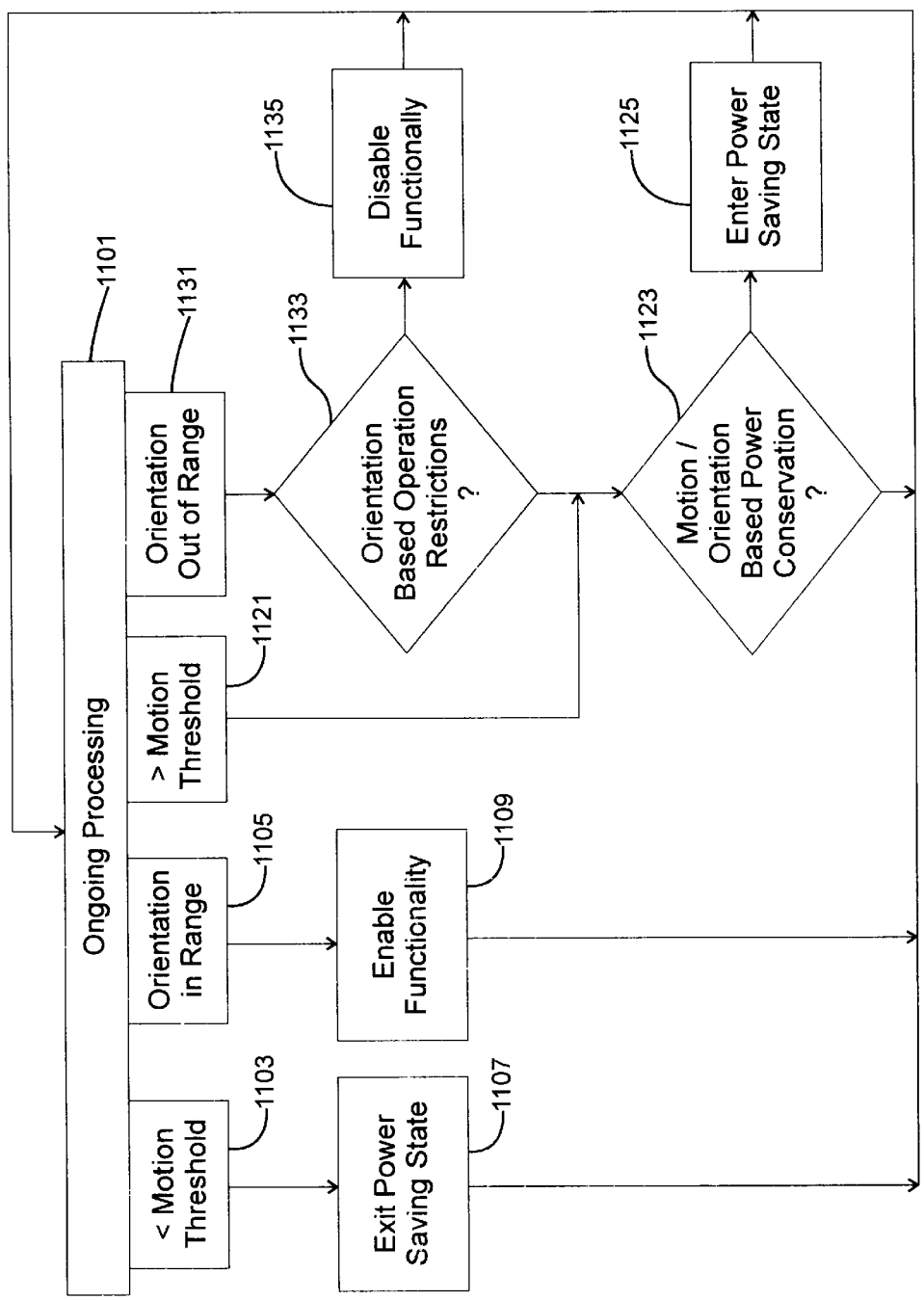
FIG. 11 is a flow diagram illustrating both safety and power saving functionality of the terminal of FIG. 8 based on terminal orientation and motion.

FIG. 11 is an exemplary flow diagram illustrating both safety and power saving functionality of the terminal of FIG. 8 based on terminal orientation and motion. At block 1101, the terminal has previously set up and enabled a virtual trigger button. If the terminal is not experiencing unacceptable motion or orientation, the terminal is not forced into a power saving state or otherwise forced to disable some functionality, i.e., the terminal is in a powered up and all circuitry is in a fully enabled status. The event blocks 1103 and 1105 along with corresponding blocks 1107 and 1109 represent this status.

Upon detecting unacceptable motion as indicated by the event block 1121, the terminal branches to a block 1123 to consider whether motion restrictions have been disabled. If so, the terminal returns to block 1101 to continue processing. Otherwise, the terminal branches to a block 1125 to enter a low power saving state. Upon dropping below the motion threshold as indicated by the event block 1103, the terminal exits the power saving state at the block 1107.

Similarly, if the orientation of the terminal is outside of normal operating range as indicated by an event block 1131, the terminal considers whether orientation restrictions have been enabled at a block 1133. If so, the functionality having such restrictions is disabled at the block 1135, and the terminal returns to the ongoing processing state at the block 1102. Such disablement at the block 1135 might, for example, prevent future triggering of the code reader circuitry or capture module of the terminal. Thereafter, when orientation returns in range as identified by the block 1105, the terminal enables the functionality at the block 1109 and returns to ongoing functionality at the block 1101. If at the block 1133 the terminal has no orientation restrictions, the terminal branches to the block 1123 to consider power saving restrictions. The terminal branches back to the block 1101 if orientation based power saving restrictions have been disabled. Otherwise, the functionality having such restrictions is directed into a low power state at block 1125.

The processes represented by the flow charts of FIGS. 9–11 are merely representative of the many approaches for carrying out the functionality of the present invention. Many other variations and modifications are possible.

Figure 12:
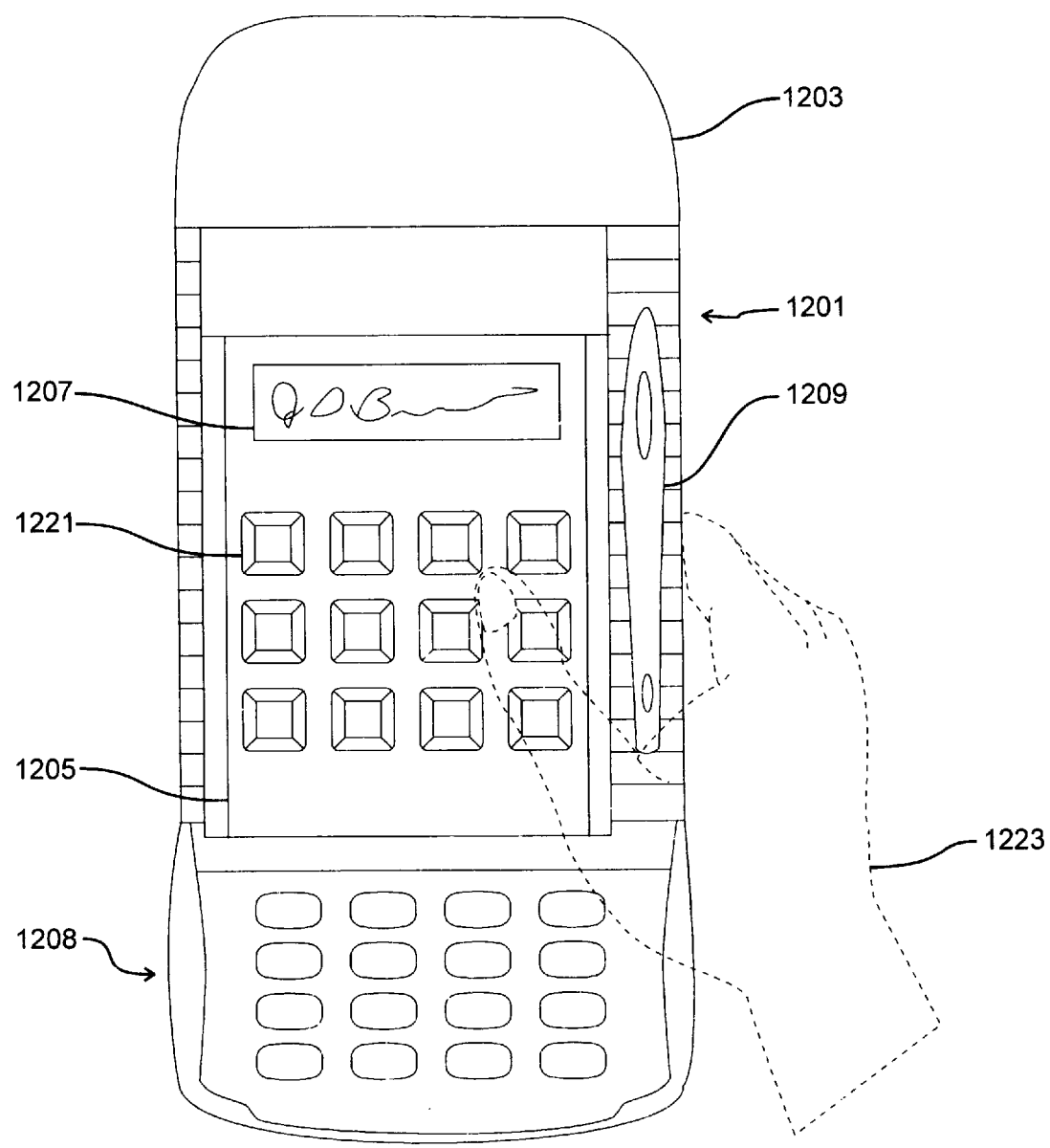
FIG. 12 is a diagram illustrating a virtual keyboard wherein a touch panel depression caused by a user's hand is not recognized as intentional while a signature is being captured.

FIG. 12 is a diagram illustrating a virtual keyboard wherein a touch panel depression caused by a user's hand is not recognized as intentional while a signature is being captured. In particular, a terminal 1201 includes a image capture module 1203 and a display 1205 having a touch panel assembly disposed thereon. In addition to capturing images, the terminal 1201 is also used to capture data via a real keypad 1208, a virtual keyboard 1221 and a virtual signature field 1207. The user may use fingers or a stylus 1209 to interact with the virtual keyboard 1221.

To capture signatures, the stylus 1209 is used as a pen to write the signature within the signature field 1207 on the display 1205. However, in doing so, the user typically rests their hand on the display creating a touch image 1223. Using the techniques previously described, the user may freely do so while writing their signature without worrying about unintentionally triggering any of the buttons of the virtual keyboard 1221. Thus, the user need not be concerned about activating the module 1203 during the signing process. Similarly, any other type of touch image that does not "look like" the captured exemplary touch image(s) will also effectively be ignored.

In view of the above detailed description of a preferred embodiment and modifications thereof, various other modifications will now become apparent to those skilled in the art. For example, the orientation and/or motion disablement features may also be implemented in terminals with a real trigger, not a virtual trigger. Moreover, both or either no motion and rapid motion indications can be used to trigger the entering of a low power state, depending on the circumstances involved.

Clearly, many reasonable variations are possible. Moreover, the claims of the invention below are intended to encompasses the disclosed embodiments and all reasonable modifications and variations without departing from the spirit and scope of the invention.

What is claimed is:

1. A portable data collection terminal utilized by any of a plurality of users, the terminal comprising:
   a housing;
   a display disposed on the housing;
   a touch sensitive panel assembly disposed on the display;
   an image capture circuit;
   a virtual button displayed on the display used to trigger the image capture circuit; and
   the position of the virtual button on the display being selected by any of the plurality of users via the touch sensitive panel.

2. The portable data collection terminal of claim 1 further comprising orientation sensing circuitry that selectively disables the image capture circuit.

3. The portable data collection terminal of claim 1 further comprising motion sensing circuitry that selectively disables the image capture circuit.

4. The portable data collection terminal of claim 1 further comprising a second virtual button and a radio modem controllable by the second virtual button.

5. The portable data collection terminal of claim 1 wherein the touch sensitive panel assembly generates touch image information used in attempts to identify intentional selection of the virtual button.

6. The portable data collection terminal of claim 5 wherein only touch image information that is identified as intentional causes a triggering of the image capture circuit.

7. The portable data collection terminal of claim 1 wherein the virtual button comprises two buttons requiring simultaneous depression to cause triggering of the image capture circuit.

8. A portable data collection terminal utilized by any of a plurality of users, the terminal comprising:
- a control circuit;
- a display coupled to the control circuit;
- a touch sensitive panel assembly disposed on the display which generates touch image information;
- a panel interface circuit coupled to the touch sensitive panel assembly;
- a first circuit supporting a predetermined functionality;
- a virtual button displayed on the display used to trigger the first circuit; and
- the control circuit and panel interface circuit together attempting to screen unintentional selections of the virtual button based on the touch image information.

9. The portable data collection terminal of claim 8 further comprising an orientation sensor coupled to the control circuit, and the control circuit selectively responding to the orientation sensor to attempt to screen unintentional selections of the virtual button.

10. The portable data collection terminal of claim 9 further comprising a motion sensor coupled to the control circuit, and the control circuit selectively responding to the motion sensor to attempt to screen unintentional selections of the virtual button.

11. The portable data collection terminal of claim 10 wherein the control circuit also selectively responds to the motion sensor by entering a low power state.

12. The portable data collection terminal of claim 8 wherein the virtual button comprises two buttons requiring simultaneous depression to cause triggering of the first circuit.

13. The portable data collection terminal of claim 8 wherein the first circuit comprises an image capture circuit.

14. The portable data collection terminal of claim 8 wherein the first circuit comprises a radio modem.

* * * * *